Dec. 21, 1926.

S. W. RUSHMORE 1,611,861

LUBRICATING SYSTEM FOR INTERNAL COMBUSTION ENGINES

Filed Oct. 27, 1924

INVENTOR
Samuel W. Rushmore
BY
ATTORNEY

Patented Dec. 21, 1926.

1,611,861

UNITED STATES PATENT OFFICE.

SAMUEL W. RUSHMORE, OF PLAINFIELD, NEW JERSEY.

LUBRICATING SYSTEM FOR INTERNAL-COMBUSTION ENGINES.

Application filed October 27, 1924. Serial No. 746,025.

One of the principal difficulties encountered in connection with pressure feed lubricating systems is to insure a proper supply of lubricant to the pistons at the time a cold engine is started. If the oil is cold it may not reach the piston for several minutes after the engine has been started because it takes some time for the oil to become sufficiently warm to flow freely through the oil ducts and deliver the supply to be splashed by the crank in the usual way. This failure of oil supply upon starting has a very destructive effect on the pistons which soon become scored or scuffed.

A contributing factor to this undesirable effect is the fact that when a cold engine is started, the carburetor choke valve or a flooder or a supplemental fuel duct of some character is usually operated. Consequently, as a result, the cylinders are flooded and flushed with an excess of cold liquid gasoline which washes away the small amount of lubricant which may be on the cylinders and piston walls.

Due to the high viscosity and sluggishness of ordinary cylinder oil when cold, the oil pump will build up an excessive pressure when starting the engine and one feature of my present invention involves the utilization of such pressure to supply oil to the cylinders as soon as the engine is started, preferably by injecting the oil into the intake manifold of the engine.

The usual oil feed pump normally operates at, say, 15 lbs. pressure, the system being ordinarily equipped with a pressure relief valve opening at about this pressure and by-passing excess oil directly back to the sump in the bottom of the crank case. When the oil is too cold or too viscous for any other reason, the flow resistance in the return pipe causes excessive back pressure at greater than 15 lbs. and I utilize such excessive pressure to open a supplemental oil duct through which the high pressure oil is released directly to the intake manifold. Thus, initial high oil pump pressures may be used for delivering desired quantities of the oil through the manifold to the cylinders which are then in great need of lubricant. In this way, oil reaches the cylinders long before it becomes sufficiently warm to flow freely through the crank shaft bearings to lubricate the cylinders by splash from such bearings. This result may be accomplished either by the use of a supplemental pressure relief valve or by changing the ordinary pressure relief valve to successively uncover the return duct to the sump and the oil duct to the manifold. In either instance, normal operation of the system is in no way affected since after the oil becomes warmed up, its viscosity and flow resistance become too small to maintain the back pressure required to keep the duct to the manifold open and the lubricating system operates in the regular way until back pressure again becomes excessive. It is to be noted that the setting of the valve and the design of the oil pump may be such that excess pressures and the opening of the supplemental valve will result merely from excessive high speed of the engine even when the oil is hot, but at such speeds, the excess lubricant for the pistons is highly desirable.

In accordance with another feature of the invention, I obviate the danger of scuffing the pistons during the first few minutes of a run by controlling the auxiliary oil line to manifold directly or indirectly from the operating means for the carburetor choke valve, or other "richener" or "flooder" so that when the latter is operated to flood gasoline into the cylinders, such flooding is accompanied by an excessive flow of lubricating oil into the manifold which will in large measure counteract the tendency of the gasoline to prevent proper lubrication.

On certain types of cars, moderate use of the choke valve for purposes of acceleration, which is permissible after the engine has warmed somewhat, will not involve sufficient flooding to endanger proper lubrication. When the supplemental control line is operated from this valve, therefore I prefer to employ a lost motion connection between the oil valve and the choke valve so that the choke valve must be thrown almost to its closed position before the valve in the supplemental oil line opens.

Regardless of whether I control the flow of oil into the manifold by the carburetor choke valve or by an auxiliary pressure valve, a structural feature of importance is the arrangement of the oil duct to the manifold in such a manner that oil is delivered at the union of the manifold arms directly in the path of the upflowing current of fuel gas. Due to the presence of the rapidly flowing gas current and due also the fact that extremely low pressures prevail in the manifold just after the engine has been started, the oil is quickly atomized and is sucked into the cylinders without having a chance to collect on the interior walls of the manifold.

The invention may be better understood from the following detailed description in connection with the accompanying drawings, wherein—

Figures 1, 2:
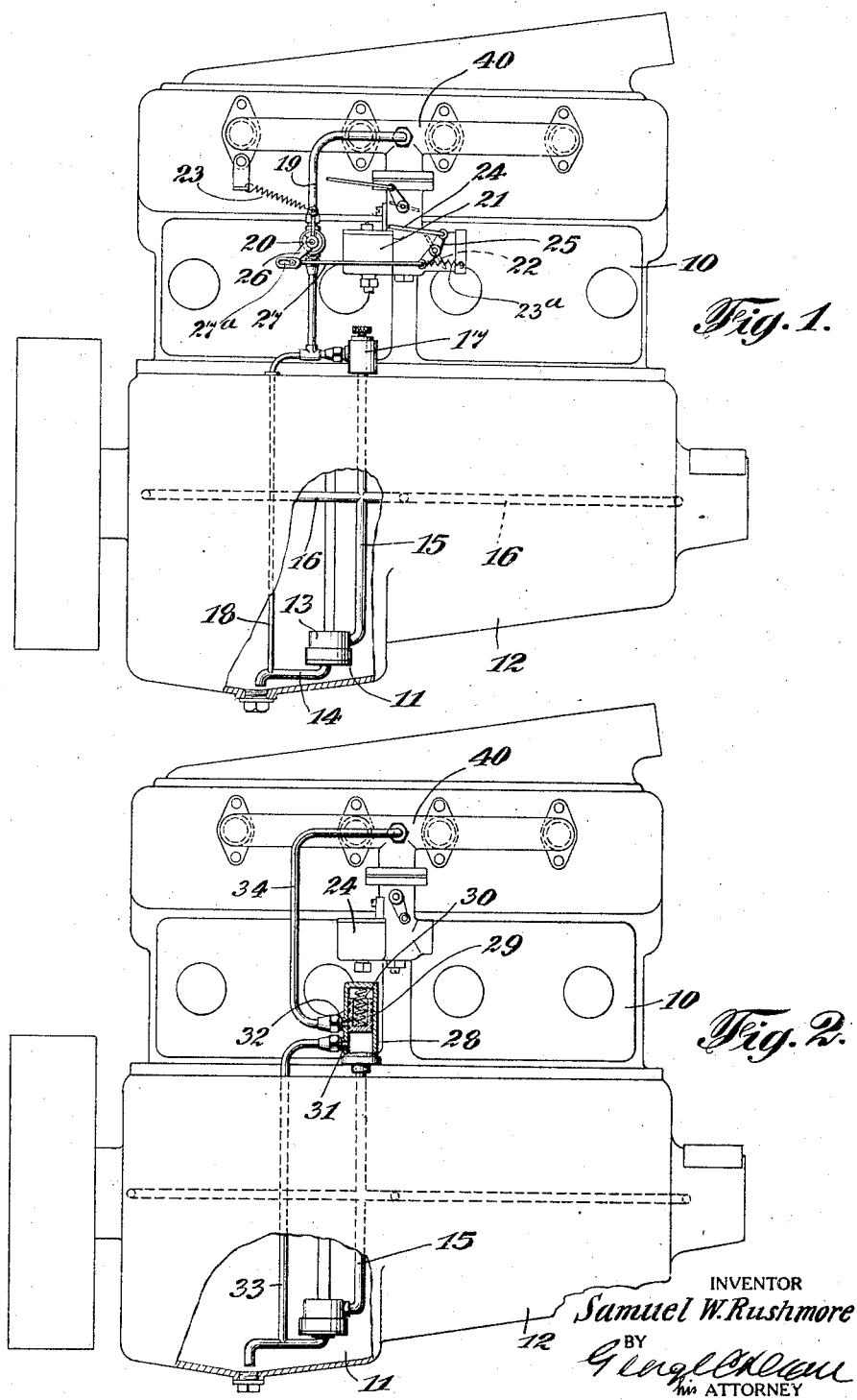
Fig. 1 is a side view of an internal combustion engine embodying one form of the invention, the crank case being partly broken away and in section for clearness.
Fig. 2 is a similar view illustrating a modified form of control for the supplemental oil duct to the manifold.

In Fig. 1, I have shown the supplemental oil duct controlled by the operating means for the carburetor choke valve and in this view the engine 10 is provided with the usual oil reservoir or sump 11 in the bottom of the crank case 12. The pressure feed lubricating system includes a conventional pump 13 removing oil from sump 11 through a pipe 14 and delivering it under pressure to a main supply pipe 15 from which leads 16 are taken off to the crank shaft and cam shaft bearings (not shown). Excess pressure in the supply pipe is adapted to be relieved by a relief valve 17 which bypasses oil back to the sump or back to the pipe 14 through a relatively restricted return pipe 18.

A relatively capacious oil duct 19 connects the upper portion of the pipe 18 directly with the union of the arms of the intake manifold 40, flow through the pipe 19 being controlled by a valve such as the rotary plug valve 20. 21 represents the usual carburetor for delivering a fuel mixture to the manifold and 22 indicates the carburetor choke valve adapted to be closed by an actuating link 24 acting on an operating lever 25 when it is desired to cut off the air and introduce a rich mixture into the manifold. By connecting the operating lever 25 of the carburetor choke valve directly to the operating lever 26 on the valve 20, as by link 27 and using a spring 23 which tends to hold valve 22 open and valve 20 closed, it will be seen that whenever the choke valve is operated to richen the fuel mixture, valve 26 will be opened to permit a flow of oil directly into the manifold where it will be partially atomized and carried along with the fuel to the cylinders. The oil inlet is directly in the path of the upflowing current of gaseous or semi-gaseous fuel and since upon starting the engine abnormally low pressures obtain in the manifold, the oil will be sucked and swept to the cylinders without having a chance to collect on the inner walls of the manifold 40.

If the line 27 has a slot and pin connection as at 27ª, with the operating levers of either of the valves 22 a lost motion connection will be provided which will permit the choke valve to be slightly closed as when accelerating the engine without flooding oil into the manifold. In other words, the oil valve cannot open until the choke valve has been closed beyond a limit predetermined by the length of the slot in link 27. The use of the lost motion connection involves the use of an additional spring 23ª acting directly on the valve 22 to take up the lost motion incidental to return of valve 23ª to its normal open position.

The choke valve is ordinarily operated only upon starting the engine at which time the pressure prevailing in the main supply pipe 15 is ample to maintain the relief valve 17 open. Due to the restricted capacity of pipe 18, such pressure will inject a comparatively large amount of oil through the pipe 19 directly into the manifold, thereby obviating the danger of scuffing the pistons due to the poor lubrication.

With the form of invention shown in Fig. 2, I utilize the high oil pressures prevailing upon starting the engine to inject lubricant directly into the manifold independently of whether the choke valve be open or closed.

In this figure, the reservoir pipe 15 opens at its upper end into a cylindrical valve casing 28 housing a pressure relief valve 29 in the nature of a piston normally urged to closed position by a coiled expansion spring 30. The valve casing is provided with a pair of outlet ports 31, 32 adapted to be successively uncovered by the piston as pressure in the pipe 15 increases. Duct 31 leads to a return or by-pass pipe 33 delivering oil back to the sump while duct 32 opens into a supplemental oil supply pipe 34 delivering oil directly to the intake manifold of the engine. In operation, valve 29 will uncover the port 31 at a pressure of approximately 15 lbs. to by-pass oil back to the sump through the pipe 33. At a higher pressure, say 30 lbs., valve 29 uncovers the port 32. As noted above, the pressure very rapidly builds up in the supply pipe when a cold engine is started, the flow resistance and back pressure of the cold oil opposing the pump pressure, and thereby quickly raising the pressure in pipe 15 to a point where the valve 29 will uncover the port 32 and supply lubricant directly to the manifold through the pipe 34. As soon as the oil has become warmed up sufficiently to flow freely, and lubricate the cylinder walls by the splash from the crank shaft bearings, pressure on the valve 29 will decrease and the port 32 will be cut off at a time when the auxiliary or emergency supply line 34 is no longer needed.

Having in view, the objects which are to be accomplished by the supplemental oiling system, it will be obvious that in its broader aspects, the invention may include supplying oil directly from an oil container mounted on the engine instead of from the regular pressure feed system. This is especially true in so far as the choke valve is concerned and it will be evident that valve 20 might control flow from a gravity feed oil cup or similar device as well as from the pressure feed system.

I claim:

1. In an internal combustion engine, the combination with the intake manifold and the pressure feed lubricating system, including a pump and a relief valve, of an oil line adapted to place the pressure feed system in direct communication for force feeding oil into the interior of the manifold, said relief valve being adapted to open said oil line only when abnormally high pressures obtain in the lubricating system.

2. In an internal combustion engine, the combination with the intake manifold, pressure feed lubricating system, carburetor, and gasoline flooding means associated with the carburetor, of means operable simultaneously with the said flooding means for force feeding lubricating oil directly from the pressure feed system to the interior of the manifold.

3. In an internal combustion engine, the combination with the intake manifold, pressure feed lubricating system, carburetor, and gasoline flooding means associated with the carburetor, of means operable simultaneously with the said flooding means for force feeding lubricating oil directly from the pressure feed system to the interior of the manifold directly in the path of the fuel stream passing through the manifold from the carburetor.

4. In an internal combustion engine, the combination with the intake manifold, pressure feed lubricating system, carburetor, and choke valve or the like associated with the carburetor, of an oil line leading directly from the pressure feed system to force feed oil into the intake manifold, a valve in said line, and means coupling said valve and the choke valve for simultaneous operation.

5. In an internal combustion engine, the combination with the intake manifold, a pressure feed lubricating system, a carburetor, and means for partially or entirely throttling the air to the carburetor whereby to effect flooding of the manifold with liquid gasoline, of means for delivering quantities of lubricating oil directly from the pressure feed system to force feed oil into the interior of the manifold operatively connected with the air throttling means.

6. In an internal combustion engine, the combination with an intake manifold, a pressure feed lubricating system, a carburetor, and a carburetor choke valve, of an oil line leading directly from the pressure feed system to force feed oil into the interior of the manifold, a valve controlling said line, an operating lever for said valve, an operating lever for the carburetor choke valve and a means connecting said levers for simultaneous operation of the two valves.

7. In an internal combustion engine, the combination with the intake manifold, pressure feed lubricating system, carburetor, and choke valve or the like associated with the carburetor, of an oil line leading directly from the pressure feed system to force feed oil into the intake manifold, a valve in said line, and means coupling said valve and the choke valve for simultaneous operation, said means including a lost motion connection to permit a slight opening of the choke valve without operating the oil valve.

8. In an internal combustion engine, the combination with the intake manifold, a pressure feed lubricating system, a carburetor, and means for partially or entirely throttling the air to the carburetor whereby to effect flooding of the manifold with liquid gasoline, of means for force feeding quantities of lubricating oil directly from the pressure feed system to the interior of the manifold operatively connected with the air throttling means, by lost motion connection.

9. In an internal combustion engine, the combination with an intake manifold, a pressure feed lubricating system, a carburetor and a carburetor choke valve, of an oil line leading directly from the pressure feed system to force feed oil into the interior of the manifold, a valve controlling said line, an operating lever for said valve, an operating lever for the carburetor choke valve and a means connecting said levers for simultaneous operation of the two valves said means including a lost motion connection.

Signed at Plainfield, in the county of Union, and State of New Jersey, this 25th day of October, A. D. 1924.

SAMUEL W. RUSHMORE.